United States Patent [19]
Döhler et al.

[11] Patent Number: 4,978,726
[45] Date of Patent: Dec. 18, 1990

[54] POLYSILOXANES WITH (METH)ACRYLATE ESTER GROUPS LINKED OVER SIC GROUPS AND THEIR USE AS RADIATION-CURABLE COATING MATERIALS FOR SHEET-LIKE CARRIERS

[75] Inventors: Hardi Döhler, Essen; Jürgen Jachmann, Herne; Christian Weitemeyer, Essen; Dietmar Wewers, Bottrop, all of Fed. Rep. of Germany

[73] Assignee: Th. Goldschmidt AG

[21] Appl. No.: 352,823

[22] Filed: May 15, 1989

[30] Foreign Application Priority Data

Jun. 15, 1988 [DE] Fed. Rep. of Germany ....... 3820294

[51] Int. Cl.$^5$ ............................................. C08F 283/00
[52] U.S. Cl. ..................................... 525/479; 522/99; 528/26; 528/40
[58] Field of Search ................... 528/26, 40; 525/479; 522/99

[56] References Cited

U.S. PATENT DOCUMENTS 4,568,566 2/1986 Tolentino ........................... 427/54.1
4,777,233 10/1988 Suzuki et al. ........................ 528/26

FOREIGN PATENT DOCUMENTS 0152179 8/1985 European Pat. Off. .

OTHER PUBLICATIONS

"Macromolekulare Chemie" (Rapid Communication, 7, (1986), 703–707.

Primary Examiner—Melvyn I. Marquis
Attorney, Agent, or Firm—Toren, McGeady & Associates

[57] ABSTRACT

Novel polysiloxanes with (meth)acrylate groups and monocarboxylate groups and their use as radiation-curable abhesive coating matrials are disclosed. The modified polysiloxanes adhere well to the support that is to be coated and can be cured at a high rate on the support. The cured coating has good chemical and physical stabilities and a high flexibility. The abhesive properties can be adapted to the chemical character of the adhesives, so that the desired degree of abhesiveness is obtained.

11 Claims, No Drawings

POLYSILOXANES WITH (METH)ACRYLATE ESTER GROUPS LINKED OVER SIC GROUPS AND THEIR USE AS RADIATION-CURABLE COATING MATERIALS FOR SHEET-LIKE CARRIERS

FIELD OF INVENTION

The invention generally relates to novel polysiloxanes with (meth)acrylate ester groups linked over SiC groups.

Considered from another aspect, the invention is directed to radiation-curable abhesive coating materials and compositions for sheet-like supports comprising the novel polysiloxanes and coated products having a radiation-cured coating layer of such polysisoxanes.

BACKGROUND INFORMATION AND PRIOR ART

Abhesive coatings are used on a large scale for coating sheet-like materials, in order to reduce the adhesive tendency of adhering products towards these surfaces. Abhesive coating compositions are used, for example, to coat papers or films, which serve as support for pressure-sensitive labels. The labels, provided with pressure-sensitive adhesives, adhere to the coated surface only to an extent sufficient to make it possible to handle the support films carrying the adhesive labels. It must, however, be possible to pull the labels from the coated support film without appreciable loss of adhesive force for later use. Further possibilities for employing abhesive coating compositions are packaging papers, especially for packaging adhesive goods. Such abhesive papers or films are used, for example, for packaging foods or technical products, such as bitumen.

As abhesive coating compositions, cross linkable organopolysiloxanes, especially radiation-curable organopolysiloxanes, modified with acrylate ester groups, have proven themselves.

For instance, a method is disclosed in the German Patent No. 2,948,708 for the preparation of pentaerythritol triacrylate ester- or pentaerythritol trimethacrylate ester-modified organopolysiloxanes from organochloropolysiloxanes, optionally with the addition of HCl-binding neutralizing agents, in which organopolysiloxanes of the general formula

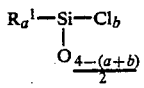

($R^1$=alkyl with 1 to 4 carbon atoms, vinyl and/or phenyl, with the proviso that at least 90 mole percent of the $R^1$ groups are methyl; "a" has a value of 1.8 to 2.2; "b" has a value of 0.004 to 0.5) are reacted at first with, based on the SiCl groups, at least 2 molar amounts of a dialkylamine, the alkyl groups of which in each case have 3 to 5 carbon atoms and the carbon atoms adjacent to the nitrogen carrying in each case no more than one hydrogen atom. The reaction product is then allowed to react with at least equimolar amounts of pentaerythritol triacrylate or pentaerythritol trimethacrylate, whereupon solid components are separated from the end product by known methods.

A coating composition prepared by this method already exhibits good abhesive properties, adhesive tapes in contact with the coating composition largely retaining their adhesive power towards untreated substrates. It has, however, turned out that the property of abhesiveness must always be viewed in conjunction with the chemical structure and the structure of the adhesive, towards which the coating material is to exhibit abhesive properties. The abhesive coating material described in the German Patent No. 2,948,708 was therefore unable to provide satisfactory results in all cases, since its properties could not be adapted to the different adhesives.

Improved properties are already shown by (meth)acrylate ester-modified organopolysiloxane mixtures, which are characterized by the fact that they consist of an equilibrated organopolysiloxane with, on the average, >25 to <200 silicon atoms, of 2 to 30% by weight of organopolysiloxanes with, on the average, 2 to 25 silicon atoms and of 2 to 30% by weight of organopolysiloxanes with, on the average, 200 to 2,000 silicon atoms. The organopolysiloxanes contained in this ternary mixture have different tasks. The low molecular weight fraction essentially has the task of bringing about the adhesion between the coating composition to the substrate. The high molecular weight fraction serves predominantly for bringing about the desired abhesiveness of the coating composition.

The middle fraction is the curable matrix, which is responsible especially for the physical properties of the coating composition. Those skilled in the art will understand that this is only a simplified description of the properties and tasks of the three different fractions, since the complex properties, which an abhesive coating agent must have, can be obtained only through the combined action of the three components. With the modified organopolysiloxane mixture of the German Patent No. 3,426,087, it has become possible, on the one hand, to improve the abhesive properties of the mixture towards adhesive surfaces and, on the other, to improve the adhesive properties towards the substrate, on which the coating material is applied and on which it is cured. Nevertheless, it has turned out that the properties of these coating compositions cannot yet be adapted adequately to the different adhesives.

In the European Offenlegungsschrift No. 0,159,683, electron beam-curable, liquid coating materials are described, which should contain:

1. 60 to 95 parts of an organopolysiloxane with more than about 25 siloxane groups per molecule and 2 to 10 parts of reacted carbonyl groups per molecule, the remaining substituents on the silicon being hydrocarbon groups with 1 to 20 carbon atoms; reacted carbinol groups are defined as esters of acrylic acid, methacrylic acid or mixtures or ethers of a hydroxyalkyl ester of these acids, the alkyl group containing 2 to 4 carbon atoms; unreacted carbinol groups should essentially not be present anymore, so that the hydroxyl number is less than 10;

2. 3 to 25 parts of a polyester of a multihydric alcohol with acrylic acid, methacrylic acid or mixtures of these acids, the multihydric alcohol containing 2 to 4 hydroxyl groups per molecule and having a molecular weight of less than 1,200;

3. 1 to 10 parts by weight of acrylic acid, methacrylic acid or mixtures of these acids.

The additional use of the (meth)acrylate ester of a polyalcohol increases the rate of curing; on the other hand, as a result of the increase in the organic portion, it has a disadvantageous effect on the flexibility and abhesiveness of the coating material. The free acrylic acid or methacrylic acid content is an additional disadvantage. This content leads to an annoying odor and, during the application on the material to be coated, makes the processing difficult.

Because they are radiation curable, organopolysiloxanes with acrylate ester groups have been suggested for a series of further possible applications. Acrylate ester-modified organopolysiloxanes are used as coating lacquers for sealing and embedding electric and electronic components and for producing shaped objects. In connection with the possible structures of such acrylate ester-modified polysiloxanes, the following Offenlegungsschriften, Auslegeschriften and patents are named:

The German Auslegeschrift No. 2,335,118 relates to optionally substituted, acrylate group-containing organopolysiloxanes of the general formula

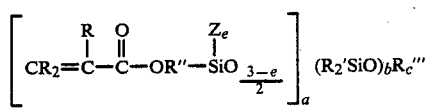

(R=hydrogen or monovalent hydrocarbon groups with 1 to 12 carbon atoms; $R^1$=monovalent, optionally halogenated hydrocarbon groups or cyanoalkyl groups with 1 to 8 carbon atoms; R''=divalent hydrocarbon groups with 1 to 18 carbon atoms or C—O—C bonds containing divalent hydrocarbon groups; R'''=R''''O$_{0.5}$ or R$_3$'SiO$_{0.5}$; Z=OR'''', R'''' or OSiR$_3$'; R''''=alkyl group with 1 to 12 carbon atoms; "a" and "b" in each case represent numbers from 1 to 20,000; c is a number from 0 to 3; e is a number from 0 to 2; at least one of the Z groups is OR'''', when c=0). The siloxane polymers can be used as intermediates in the preparation of copolymers, which contain organopolysiloxane segments and find use as coating compositions. Moreover, the acrylate functional siloxane polymers can serve as sizing agents and protective coating compositions for paper and fabrics. These products are, however, unsuitable for the preparation of abhesive coating materials. The linear, diacrylate-modified polysiloxanes of the German Auslegeschrift No. 2,335,118, moreover, by definition, contain alkoxy groups, which can be split off hydrolytically and lead to further cross linking of the polysiloxanes with worsening of the elastic properties, which are important for a coating composition.

The German Offenlegungsschrift No. 3,044,237 discloses polysiloxanes with lateral acrylate ester groups, which can be prepared by reacting epoxy-functional siloxanes of a particular structure with acrylic acid. The products obtained are radiation curable. They can be used as low viscosity lacquers for application over conventional oil-based printing inks. Only with considerable limitations are the products usable as abhesive coating compositions, since there is a hydroxyl group opposite each acrylate ester group.

The U.S. Pat. No. 4,568,566 discloses curable silicone preparations, which consist of (a) 75 to 100 mole percent of chemically bound siloxy units of the formula R$_3$SiO$_{0.5}$, RSiO$_{1.5}$ and SiO$_2$, as well as (b) 0 to 25 mole percent of R$_2$SiO units, a number of the R units having the structure

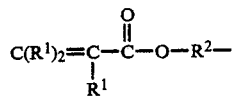

in which $R^1$ is hydrogen or a hydrocarbon group with 1 to 12 carbon atoms and $R^2$ is a divalent hydrocarbon group or an oxyalkylene group. These curable preparations are used especially for coating electronic components and as coating materials for optical fibers. They are unsuitable as abhesive coating materials for sheet-like supports because their content of R$_2$SiO units is too low.

The object of the European Offenlegungsschrift No. 0,152,179 is a silicone preparation, which can be cured to an elastomer. This preparation consists of (a) a silicone resin with a linear structure and, on the average, at least 150 siloxane units, as well as terminally linked acrylic acid groups, the regions in between being free of acrylic acid groups, (b) at least 10% finely divided silica and (c) a photoinitiator. These materials are to be used as adhesives and as sealing compounds.

Finally, reference is made to the European Offenlegungsschrift No. 0,169,592. This European Offenlegungsschrift relates to an optical glass fiber with a synthetic coating, with a glass fiber and an enveloping coating of a synthetic rubber with a refractive index, which is higher than that of the outer layer of the glass fiber. The synthetic rubber is formed from a curable plastics composition, which has a copolymer that contains, as monomeric units, dimethylsiloxane and at least one siloxane of the group formed by methylphenylsiloxane and diphenylsiloxane. The siloxane copolymer has at least two acrylate ester group per molecule, with the characteristic that the curable synthetic composition, moreover, contains a polyurethane acrylate with an average molecular weight of more than 3,000. The polysiloxane, named in the claim, may have the following formula

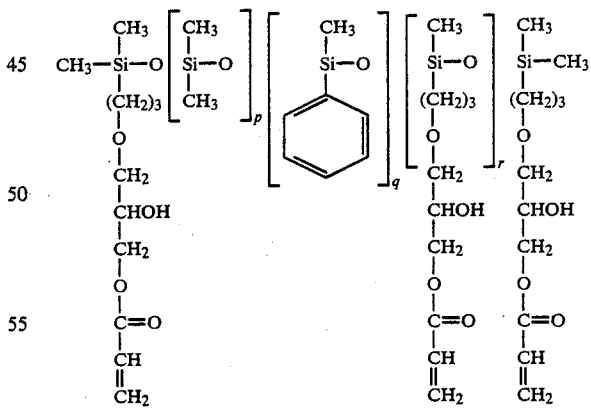

It is an essential condition that these polysiloxanes have phenyl groups linked to silicon. The phenyl group content is necessary in order to approximate the refractive index of the coating composition to that of the glass of the optical fibers. From the use of these siloxanes in combination with a polyurethane acrylate for coating optical glass fibers, it cannot be concluded that such compounds can be used as abhesive coating compositions.

In the journal "Macromolekulare Chemie" (Rapid Communication), 7, (1986), 703 to 707, the synthesis of linear methylpolysiloxanes with terminal methacrylate ester groups is described. For this synthesis, an addition reaction between α,ω-hydrogendimethylpolysiloxane and allyl epoxypropyl ether is carried out in the presence of chloroplatinic acid. The diepoxide formed is subsequently reacted with methacrylic acid in the presence of chromium diisopropyl salicylate to the desired methacrylate esters. These esters may be present in two isomeric forms:

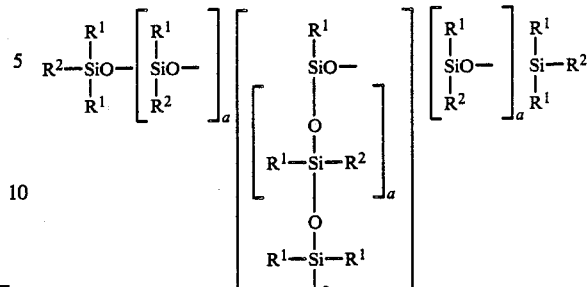

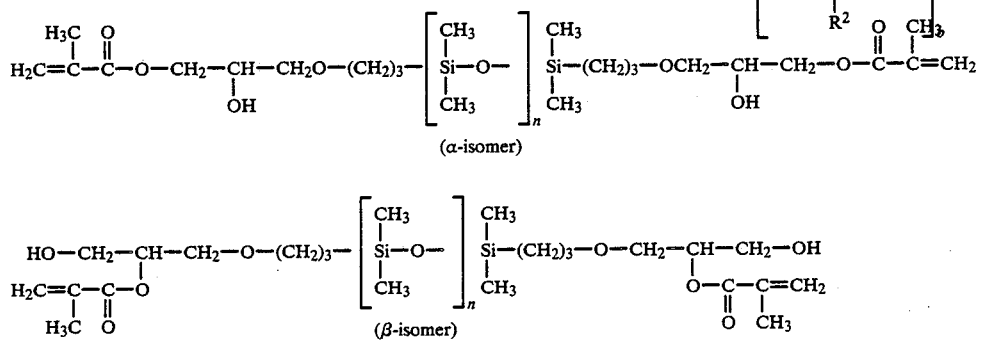

If (meth)acrylate esters are prepared according to methods of the state of the art starting out from epoxy-functional siloxanes, the epoxy groups are reacted with (meth)acrylic acid. By opening the epoxide ring, mono(meth)acrylate esters with one vicinal hydroxyl group are formed.

OBJECTS OF THE INVENTION

It is an object of the invention to provide abhesive coating compositions based on (meth)acrylate ester-modified organopolysiloxanes, which have improved properties compared to the coating compositions known from the art.

More particularly, it is an object of the invention to provide coating compositions, which can be adapted to products (adhesives) that adhere differently.

Said organopolysiloxanes, modified with (meth)acrylate ester groups, are to have especially the following combination of properties:
1. satisfactory adhesion to the particular support that is to be coated
2. a high curing rate on the support
3. chemical and physical stability of the cured coating
4. a high flexibility of the cured coating
5. abhesive properties towards adhesive products and adaptability of the abhesive coating to the chemical character of the adhesive.
6. adjustability of the desired degree of abhesiveness.

SUMMARY OF THE INVENTION

This combination of properties is found in polysiloxanes, which have (meth)acrylate ester groups linked over SiC groups and are obtained by the reaction of
(A) polysiloxanes of the general formula in which formula
the $R^1$ groups are the same or different and in each case represent lower alkyl groups with 1 to 4 carbon atoms or phenyl groups.
The $R^2$ groups may partly be $R^1$ groups; the remaining $R^2$ groups represent
70 to 100% epoxy-functional groups and
30 to 0% alkyl groups with 2 to 10 carbon atoms or hydrogen groups,
with the proviso that at least 1.8 epoxy groups are contained in the average molecule;
a has a value of 1 to 1,000 and
b has a value of 0 to 10,
with,
(B) based on the epoxide groups, 0.4 to 0.9 molar amounts of (meth)acrylic acid and reaction of the remaining epoxide groups with a monocarboxylic acid, which is free of double bonds capable of polymerizing.

The general formula I is the average formula of the epoxy-functional organopolysiloxanes required for the reaction. The individual building blocks are distributed randomly (statistically) within the polymer mixture.

The sum of the functional $[R^1,R^2SiO-]$ units is $a(2+b)$. The number of trifunctional $[R^1SiO_{3/2}-]$ units is given by the subscript "b". "a" has a value of 1 to 1,000 and preferably a value of 5 to 200. "b" has a value of 0 to 10 and preferably of 0 to 2. If b=0, the epoxy-functional organopolysiloxanes have a chain-like linear structure. The structure of the epoxy-functional organopolysiloxane, defined by the subscripts "a" and "b, is retained even after the reaction with the (meth)acrylic acid and the other monocarboxylic acid.

Within the polymeric molecule, $R^1$ can be the same or different and represents a lower alkyl group with 1 to 4 carbon atoms or a phenyl group. The alkyl groups may be linear or branched. Preferably, at least 90% of the $R^1$ groups are methyl groups.

The $R^2$ groups may partly represent $R^1$ groups. Of the remaining $R^2$ groups, 70 to 100% are epoxy-functional groups. Epoxy-functional groups are here understood to be groups, which are linked over an SiC bond to the siloxane framework and have an epoxy group. Preferred examples of epoxy-functional $R^2$ groups are

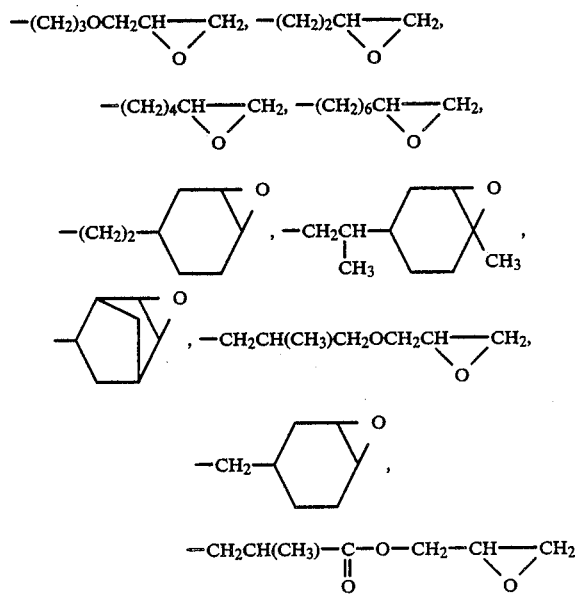

In the epoxy-functional polysiloxanes of Formula I, the preparation may result in $R^2$ groups, which have the meaning of a hydrogen group.

Up to 30% of the $R^2$ groups may be alkyl groups with 2 to 20 carbon atoms or hydrogen groups. The alkyl groups may optionally be substituted with halogen or phenyl groups. Examples of suitable and preferred $R^2$ alkyl groups are ethyl, propyl, n-butyl, i-butyl, hexyl, octyl, dodecyl, octadecyl, 2-phenylpropyl and 3-chloropropyl groups.

In selecting the various meanings for the $R^2$ group, the condition should be observed that at least 1.8 $R^2$ groups in the average molecule are epoxy-functional groups. The value of 1.8 is to be understood as a mathematical average value of a polymer mixture.

The inventive organopolysiloxanes are obtainable by reacting epoxy-functional organopolysiloxanes of the general Formula I at first with (meth)acrylic acid and subsequently with a monocarboxylic acid, which is free of double bonds capable of polymerizing, in such amounts, that all epoxide groups are esterified. In this connection, (meth)acrylic acid is intended to mean that acrylic acid or methacrylic acid or a mixture of the two acids is used. What is essential to the invention in this connection is the proviso that, based on the epoxide groups, 0.4 to 0.9 molar amounts of (meth)acrylic acid and an amount of a different monocarboxylic acid, sufficient to complete the reaction of the epoxide groups, have been reacted. This presupposes that, based on the epoxide groups, at least equimolar amounts of acid are used. Any excess of nonpolymerizable monocarboxylic acids is advantageously removed after the reaction.

Alkyl carboxylic acids and benzoic acids come into consideration as monocarboxylic acid, which are free of double bonds capable of polymerizing. As alkyl carboxylic acids, those with 2 to 11 carbon atoms are preferred. Examples of monocarboxylic acids are acetic acid, propionic acid, butyric acid, valeric acid, pivalic acid, 2,2-dimethylbutyric acid, 2,2-dimethylvaleric acid, acetoacetic acid, isooctane carboxylic acid, isodecane carboxylic acid, sorbic acid and undecanoic acid.

An especially preferred monocarboxylic acid is acetic acid.

In the inventive organopolysiloxanes, 40 to 90 mole percent of the epoxy-functional $R^2$ groups are present in the form of their (meth)acrylate esters. The remaining epoxy-functional $R^2$ groups are present in the form of the monocarboxylate esters, which are free of double bonds capable of polymerizing.

It is within the capabilities of the expert to adjust the properties of the inventive organopolysiloxanes in the following manner:

1. The abhesiveness of the inventive organopolysiloxanes, after they are cured, increases with the number of (meth)acrylate ester groups in the polymer molecule. The glass transition temperature of the cured coating increases and the flexibility decreases as the cross linking density increases. At the same time, the chemical stability and physical stability of the cured coating increase.

2. As the proportion of monocarboxylate ester groups, which are free of double bonds capable of polymerizing, increases, the abhesiveness decreases and the adhesion to the support increases. The abhesive coating can be adapted to the chemical character of the adhesive through the choice of monocarboxylic acids.

3. A further possibility of influencing the abhesive properties exists owing to the fact that up to 30% of the $R^2$ groups may be optionally substituted alkyl groups with 2 to 20 carbon atoms. Due to the presence of the alkyl groups with 2 to 20 carbon atoms, the organic character of the modified polysiloxanes in increased. In this connection, it may generally be assumed that the abhesive properties of the polysiloxane may be selectively reduced by increasing the alkyl group content as well as by increasing the chain length of the alkyl groups.

The inventive organopolysiloxanes are therefore especially suitable for being adjusted or adapted to the particular technical application. They are therefore especially suitable as radiation-curable abhesive coating composition.

In the following, examples are given of polysiloxanes with (meth)acrylate ester groups linked over SiC groups and monocarboxylate ester groups. These examples are given by way of illustration and not by way of limitation.

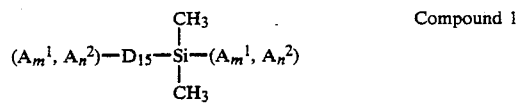

Compound 1

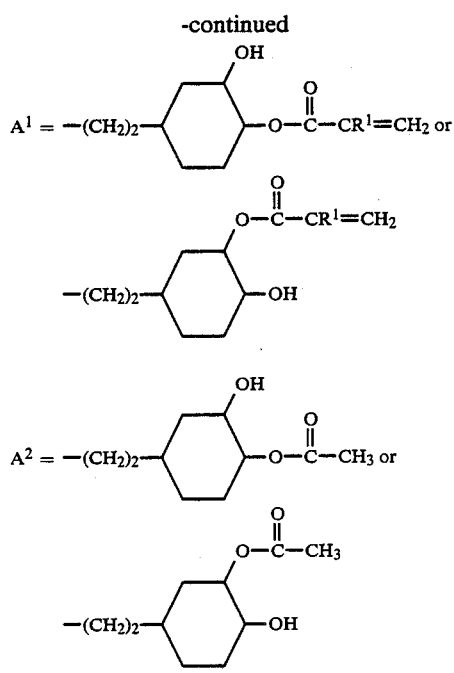
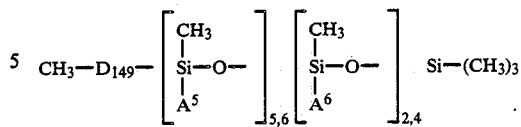
Compound 3
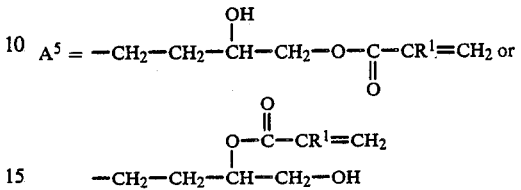
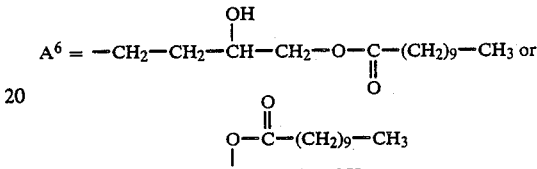
in which $R^1 = H, CH_3$.
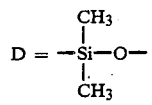
in which
$R^1 = CH_3$ or H
$D = \begin{array}{c} CH_3 \\ | \\ -Si-O- \\ | \\ CH_3 \end{array}$
$m = 0.9$
$n = 0.1$
Compound 4
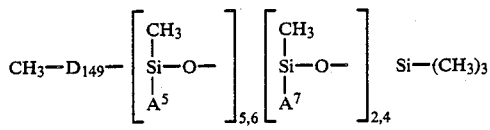
$A^5$ is defined as in compound 3,
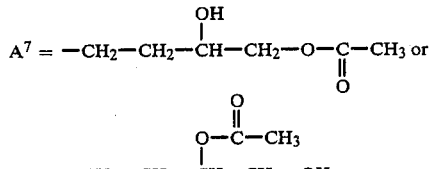
in which $R^1 = H, CH_3$.
Compound 2
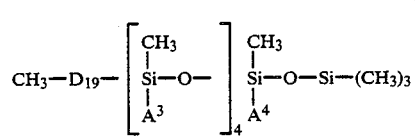
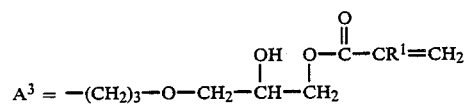
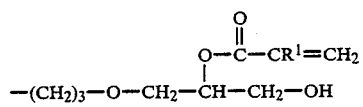
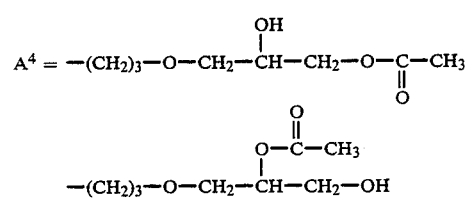
in which $R^1 = H, CH_3$.
Compound 5
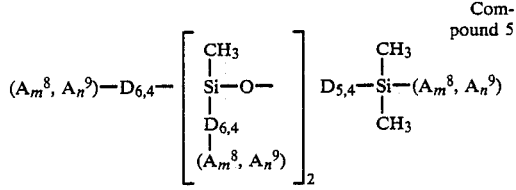
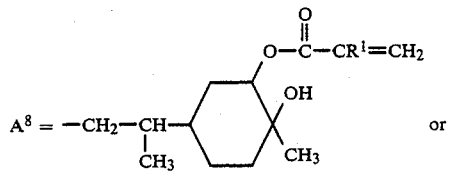
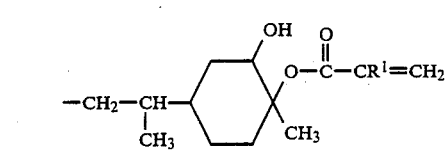

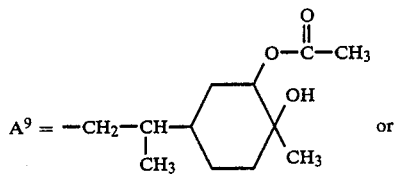

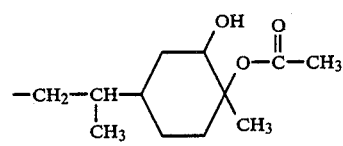

in which $R^1 = H, CH_3$
$m = 0.9$
$n = 0.1$.

Compound 6

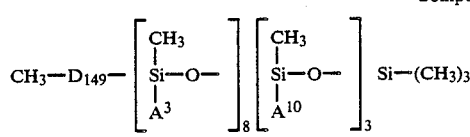

$A^3$ is as defined as in compound 2,
$A^{10} = -(CH_2)_5-CH_3$.

Compound 7

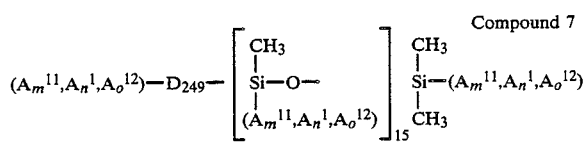

$A^1$ is defined as in compound 1
$A^{11} = -(CH_2)_7-CH_3$, or

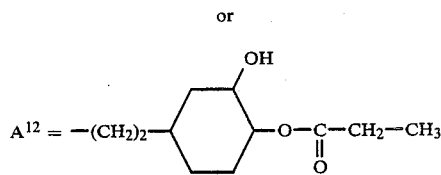

in which
$R^1 = H, CH_3$  $m = 0.59$  $n = 0.37$  $o = 0.04$.

Compound 8

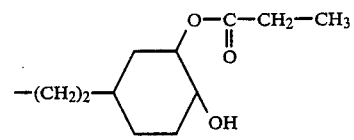

$A^3$, $A^4$ are defined as in compound 2.

Compound 9

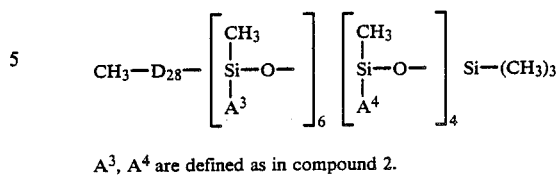

$A^3$, $A^4$ are defined as in compound 2.

Compound 10

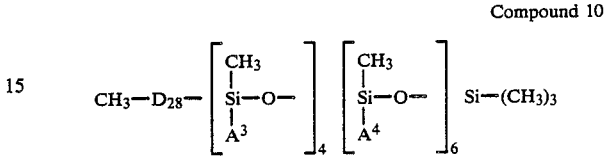

$A^3$, $A^4$ are defined as in compound 2.

The inventive organopolysiloxanes are prepared in the manner known from the art. For example, for the preparation of epoxy-functional organopolysiloxanes of Formula I, hydrogenpolysiloxanes can be used, in which $R^1$ represents a hydrogen group. These hydrogensiloxanes undergo an addition reaction with $R^{2*}$ groups, $R^{2*}$ groups corresponding to $R^2$ groups but having an olefinic double bond at the end that is intended to form a bond with the Si atom. In this reaction, unreacted SiH groups may remain in the product, so that, due to the reaction conditions, the inventive polysiloxanes may contain slight amounts of hydrogen groups as $R^2$ groups.

The epoxide groups of the epoxy-functional polysiloxanes of Formula I are reacted with 0.4 to 0.9 moles of (meth)acrylic acid per epoxide group in accordance with the following reaction.

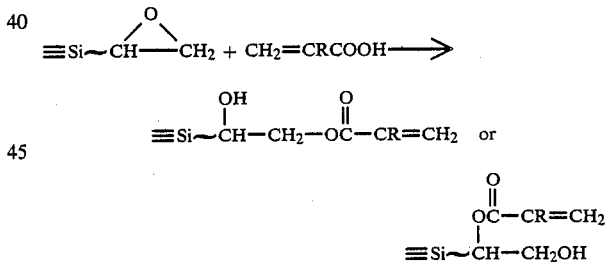

$R = H, CH_3$.

The remaining 0.1 to 0.6 mole portions of epoxide groups are now reacted in the same manner with at least equivalent amounts of a monocarboxylic acid (if necessary, in excess), which is incapable of polymerizing.

The reaction may, if necessary, be carried out in the presence of a solvent such as toluene, at elevated temperatures and especially at temperatures of 80° to 150° C.

The esterification can be accelerated by conventional catalysts, such as alkaline earth oxides, amines, acids or metal salts. The catalysts should be selected, so that the extent of possible ring-opening side reactions is kept small. Since the esterification is carried out according to the rules, generally known for this reaction, it is possible to refer to the usual handbooks of organic synthesis for details.

Optionally, to avoid premature polymerization, known polymerization inhibitors, such as hydroquinone, may be added in effective amounts during the esterification.

A further object of the invention is the use of the inventive polysiloxanes as radiation-curable abhesive coating materials for sheet-like supports. The inventive products can be used directly as such. Only in the case of UV curing is it necessary to add a free radical initiator to the modified polysiloxanes in amounts of 2 to 5% by weight, based on the siloxane.

The free radical initiator is selected on the basis of the wave length spectrum of the source of radiation used for the curing. Such free radical initiators are known and examples are benzophenone, its oximes or benzoin ethers.

It is possible to modify the coating compositions so obtained in a known fashion by the addition of further products. Such known modifying agents are siloxanes with groups, which are chemically incorporated into the coating composition during the curing process. Especially suitable as modifying agents are siloxanes with hydrogen atoms linked to silicon atoms. These may bring about such changes as a lowering of the viscosity of the coating composition, thus improving the ease of application on sheet-like supports.

It is furthermore possible to add additives to the coating materials, which, as inert substances, are enclosed by the coating composition during the curing process. Examples of such substances, dispersed in the coating composition, are highly disperse silica or polymers of fluorinated hydrocarbons.

The preparation of the inventive polysiloxanes, modified with (meth)acrylate ester groups, as well as the application properties, are described in the following examples. It is understood that these examples are given by way of illustration and not by way of limitation.

EXAMPLE 1

(of the invention)

To 248 g (2 moles) of vinyl cyclohexene oxide and 40 mL of a solution of 4 mg of $H_2PtCl_6.6H_2O$ in 3 mL of glycol dimethyl ether in a 4-liter 3-neck flask, 1170 g (1 mole) of an SiH group-containing polydimethylsiloxane of the average formula $$H-D_{15}-\underset{\underset{CH_3}{|}}{\overset{\overset{CH_3}{|}}{Si}}-H$$

$$D = -\underset{\underset{CH_3}{|}}{\overset{\overset{CH_3}{|}}{Si}}-O-$$

is added dropwise at 90° C. After 7 hours at 100° C., 500 g of toluene, 8 g of 1,4-diazabicyclo(2,2,2)octane and 0.2 g hydroquinone are added to the epoxy-functional polydimethylsiloxane so obtained and having the average formula

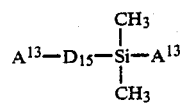

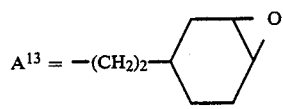

Subsequently, 130 g (1.8 moles) of acrylic acid are added dropwise at such a rate, that a temperature of 120° C. is not exceeded. After 10 hours at 100° C., 24 g (0.4 moles) of acetic acid are added. After a further 20 hours at 100° C., 1440 g (92% of the theoretical yield) of a red-brown, moderately viscous oil is obtained after distillation (100° C., 60 torr) and filtration. According to the $^1$H-NMR spectrum, this oil has the general structure $$(A_m^1,A_n^2)-D_{15}-\underset{\underset{CH_3}{|}}{\overset{\overset{CH_3}{|}}{Si}}-(A_m^1,A_n^2)$$

$A^1$, $A^2$ are defined as in compound 1,
m=0.9
n=0.1
$R^1$=H.

EXAMPLE 2

(not of the invention)

As in Example 1, from 570 g (5 moles) of allyl glycidyl ether and 1794 g (1 mole) of an SiH group-containing polydimethylsiloxane of the average formula $$(CH_3)-D_{19}-D_5{'}-Si-(CH_3)_3$$

$$D' = -\underset{\underset{H}{|}}{\overset{\overset{CH_3}{|}}{Si}}-O$$

an epoxy-functional polydimethylsiloxane of the average formula

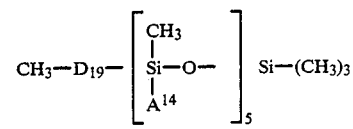

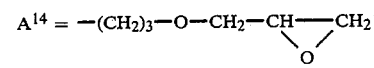

is prepared. Added to this product are 68 g of chromium(III)-containing catalyst AMC 2 of Cordova Chemical and 0.3 g hydroquinone. Subsequently, 360 g (5 moles) of acrylic acid are added dropwise at such a rate, that a temperature of 120° C. is not exceeded. After 30 hours at 100° C., distillation (100° C., 60 torr) and filtration, 2,615 g (96% of the theoretical amount) of a dark green, moderately viscous oil are obtained. According to the $^1$H-NMR spectrum, the oil has the general formula

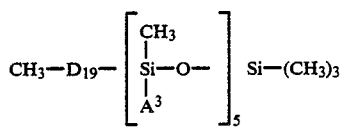

in which $A^3$ is defined as in compound 2.

EXAMPLE 3
(of the invention)

The epoxy-functional polydimethylsiloxane (2,364 g, 1 mole), prepared in Example 2 and having the average formula

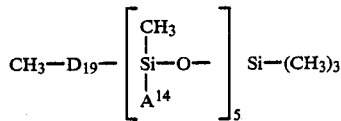

in which $A^{14}$ is as defined in Example 2, is mixed with 68 g of AMC 2 and 0.3 g of hydroquinone. Acrylic acid (288 g, 4 moles) is added at such a rate, that a temperature of 120° C. is not exceeded. After 10 hours at 100° C., 120 g of acetic acid are added. After a further 20 hours at 100° C., distillation (100° C., 60 torr) and filtration, 2,600 g (96% of the theoretical amount) of a dark green, moderately viscous oil are obtained. According to the $^1$H-NMR spectrum, the oil has the general formula

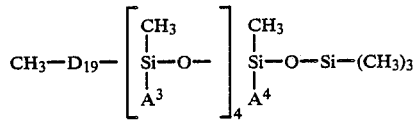

in which $A^3$ and $A^4$ are defined as in compound 2.

EXAMPLE 4
(of the invention)

As in Example 1, from 560 g (8 moles) of 1,3-butadiene monoxide and 11,594 g (1 mole) of an SiH group-containing polydimethylsiloxane of the average formula

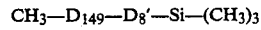

an epoxy-functional polydimethylsiloxane of the average formula

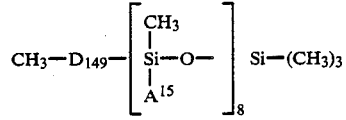

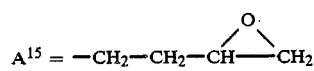

is prepared. As in Example 3, this product is reacted with 403 g (5.6 moles) of acrylic acid and 446 g (2.4 moles) undecanoic acid. After 30 hours at 100° C., distillation (100° C., 60 torr) and filtration, 12,350 g (95% of the theoretical amount) of a dark green moderately viscous oil are obtained. According to the $^1$H-NMR spectrum, the oil has the general formula

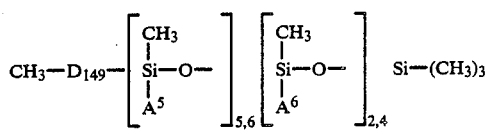

in which $A^5$ and $A^6$ are defined as in compound 3.

EXAMPLE 5
(of the invention)

The epoxy-functional polydimethylsiloxane (12,150 g, 1 mole), prepared in Example 4 and having the average formula

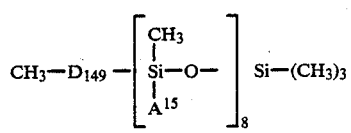

in which $A^{15}$ is defined as in Example 4, is reacted as in Example 3 with 403 g (5.6 moles) acrylic acid and 144 g (2.4 moles) acetic acid. After 30 hours at 100° C., distillation (100° C., 60 torr) and filtration, 12,060 g (95% of the theoretical amount) of a dark green moderately viscous oil are obtained. According to the $^1$H-NMR spectrum, the oil has the general formula

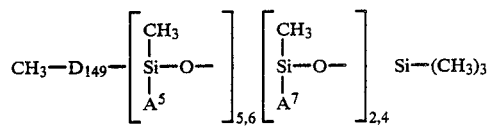

in which $A^5$ is defined as in compound 3 and $A^7$ is defined as in compound 4.

EXAMPLE 6
(of the invention)

As in Example 1, from 608 g (4 moles) of limonene monoxide and 2474 g (1 mole) of an SiH group-containing polydimethylsiloxane of the average formula

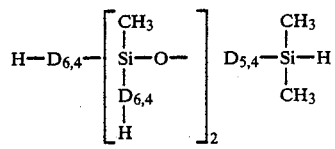

an epoxy-functional polydimethylsiloxane of the average formula

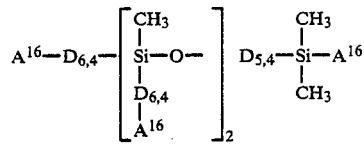

-continued

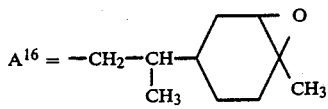

is prepared. Also as in Example 1, 260 g (3.6 moles) of acrylic acid and 24 g (0.4 moles) of acetic acid are added. After 30 hours at 100° C., distillation (100° C., 60 torr) and filtration, 3,164 g (94% of the theoretical amount) of a reddish brown, moderately viscous oil are obtained. According to the $^1$H-NMR spectrum, the oil has the general formula

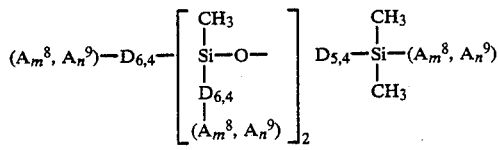

$A^8$ and $A^9$ are as defined in compound 5.
m=0.9
n=0.1
$R^1$=H.

EXAMPLE 7

(of the invention)

As in Example 1, from 912 g (8 moles) of allyl glycidyl ether, 252 g (3 moles) of 1-hexene and 11,774 g (1 mole) of an SiH group-containing polydimethylsiloxane of the average formula

an epoxy-functional polydimethylsiloxane of the average formula

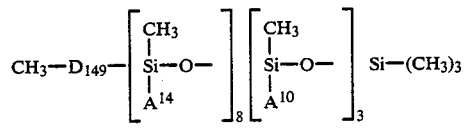

in which $A^{14}$ is as defined in Example 3 and
$A^{10}$ is as defined in compound 6,
is prepared. As in Example 3, this product is reacted with 403 g (5.6 moles) of acrylic acid and 144 g (2.4 moles) of acetic acid. After 30 hours at 100° C., distillation (100° C., 60 torr) and filtration, 13,080 g (97% of the theoretical amount) of a dark green, moderately viscous oil are obtained. According to the $^1$H-NMR spectrum, the oil has the general formula

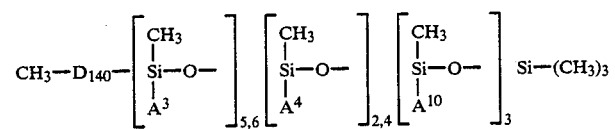

in which $A^3$ and $A^4$ are defined as in compound 2, and $A^{10}$ is as defined in compound 6.

EXAMPLE 8

(of the invention)

As in Example 1, from 1,120 g (10 moles) of octene, 868 g (7 moles) of vinyl cyclohexene oxide and 20,286 g (1 mole) of an SiH group-containing polydimethylsiloxane of the average formula

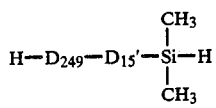

an epoxy-functional polydimethylsiloxane of the average formula

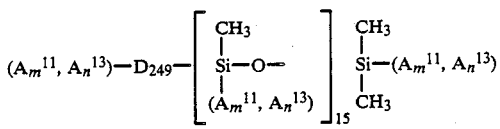

in which $A^{13}$ is defined as in Example 1,
$A^{11}$ is defined as in compound 7,
m=0.59,
n=0.41,
is prepared, As in example 3, this product is reacted with 454 g (6.3 moles) of acrylic acid and 52 g (0.7 moles) of propionic acid. After 30 hours at 100° C., distillation (100° C., 60 torr) and filtration, 21,500 g (93% of the theoretical amount) of a dark green, moderately viscous oil are obtained. According to the $^1$H-NMR spectrum, the oil has the general formula

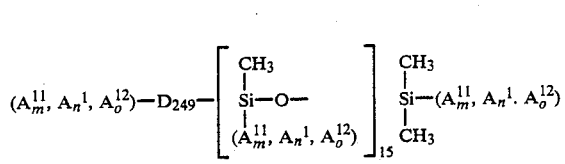

in which $A^1$ is defined as in compound 1,
$A^{11}$ and $A^{12}$ are defined as in compound 7,
m=0.59,
n=0.37
o=0.04.

EXAMPLE 9

(not of the invention)

As in example 1, from 1,140 g (10 moles) of allyl glycidyl ether and 2,760 g (1 mole) of an SiH group-containing polydimethylsiloxane of the average formula

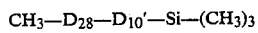

an epoxy-functional polydimethylsiloxane of the average formula

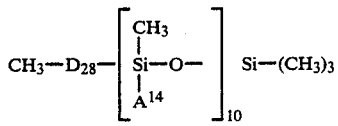

is prepared, in which $A^{14}$ is as defined in Example 2. As in example 2, this product is reacted with 720 g (10 moles) of acrylic acid. After 30 hours at 100° C., distillation (100° C., 60 torr) and filtration, 4,430 g (96% of the theoretical amount) of a dark green, moderately viscous oil are obtained. According to the $^1$H-NMR spectrum, the oil has the general formula

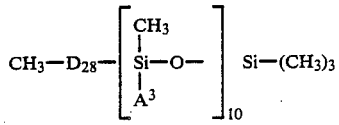

in which $A^3$ is defined as in compound 2.

EXAMPLE 10

(of the invention)

The epoxy-functional polydimethylsiloxane (3,900 g 1 mole), prepared in Example 9 and having the average formula

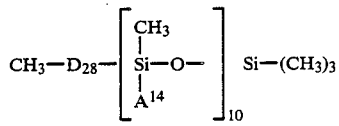

in which $A^{14}$ is defined as in Example 2, is reacted as in Example 3 with 120 g (2 moles) of acetic acid and 576 g (8 moles) of acrylic acid. After 30 hours at 100° C., distillation (100° C., 60 torr) and filtration, 4,410 g (96% of the theoretical amount) of a dark green, moderately viscous oil are obtained. According to the $^1$H-NMR spectrum, the oil has the general formula

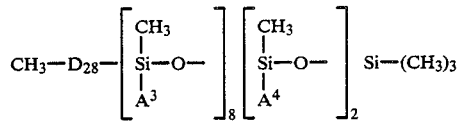

in which $A^3$ and $A^4$ are defined as in compound 2.

EXAMPLE 11

(of the invention)

The epoxy-functional polydimethylsiloxane (3,900 g, 1 mole), prepared in Example 9 and having the average formula

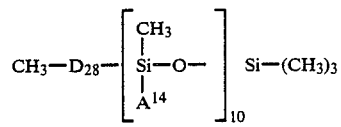

in which $A^{14}$ is defined as in Example 2, is reacted as in Example 3 with 432 g (6 moles) of acrylic acid and 240 g (4 moles) of acetic acid. After 30 hours at 100° C., distillation (100° C., 60 torr) and filtration, 4,390 g (96% of the theoretical amount) of a dark green, moderately viscous oil are obtained. According to the $^1$H-NMR spectrum, the oil has the general formula

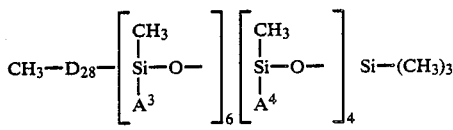

in which $A^3$ and $A^4$ are defined as in compound 2.

EXAMPLE 12

(of the invention)

The epoxy-functional polydimethylsiloxane (3,900 g, 1 mole), prepared in Example 9 and having the average formula

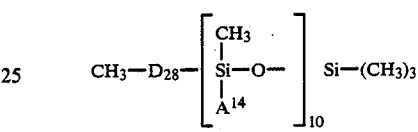

in which $A^{14}$ is as defined in Example 2, is reacted with 288 g (4 moles) of acrylic acid and 360 g (6 moles) of acetic acid. After 30 hours at 100° C., distillation (100° C., 60 torr) and filtration, 4,360 g (96% of the theoretical amount) of a dark green, moderately viscous oil are obtained. According to the $^1$H-NMR spectrum, the oil has the general formula

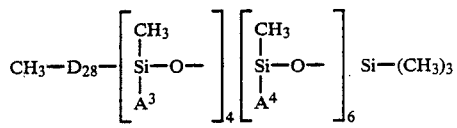

in which $A^3$ and $A^4$ are defined as in compound 2.

TESTING THE APPLICATION

To test the application properties of the polysiloxanes, modified pursuant to the invention, the products of Examples 1 to 12 are applied on different sheet-like supports (oriented polypropylene, supercalendered paper) and cured by the action of a 1.5 Mrad electron beam. The amount applied was 1.1 g/m² in every case.

For the comparison experiments, 30 mm wide adhesive tapes were used, and, moreover, two adhesive tapes, coated with acrylate adhesives and obtainable in the trade under the names of Tesa® 154 and Tesa® 970, as well as one adhesive tape coated with a rubber adhesive, which is obtainable in the trade under the name of Tesa® 969.

To measure the abhesiveness, these adhesive tapes are rolled onto the substrate and subsequently stored at 70° in the case of the acrylate adhesive tapes and at 40° C. in the case of the rubber adhesive tape. After 24 hours, the force is measured, which is required to pull the adhesive tape from the substrate at a peel angle of 180°. This force is referred to as the release force. In addition, the adhesion of the modified polysiloxane to the substrate is tested by vigorous rubbing with the thumb. In the event of defective adhesion, rubber-like crumbs are formed (the so-called "rub-off" test).

TABLE

| | Acrylate Functionality | Supercalendered paper | | | | Oriented Polypropylane Film | | | |
|---|---|---|---|---|---|---|---|---|---|
| | | Tesa ® 154 | Tesa ® 970 | Tesa ® 969 | Rub off Test | Tesa ® 154 | Tesa ® 970 | Tesa ® 969 | Rub off Test |
| | | Release Force [N] | | | | Release Force [N] | | | |
| Modified Siloxane | | | | | | | | | |
| Example | | | | | | | | | |
| 1 | 1.8 | 6 | 10 | 9 | no | 5 | 10 | 9 | no |
| 2* | 5 | 7 | 10 | 9 | no | 6 | 10 | 9 | no |
| 3 | 4 | 5 | 8 | 8 | no | 5 | 8 | 7 | no |
| 4 | 5.6 | 1 | 3 | 3 | yes | 1 | 3 | 2 | yes |
| 5 | 5.6 | 0.05 | 0.2 | 0.15 | yes | 0.05 | 0.2 | 0.15 | yes |
| 6 | 3.6 | 5 | 8 | 8 | no | 5 | 9 | 8 | no |
| 7 | 5.6 | 0.2 | 1 | 0.5 | yes | 0.1 | 0.8 | 0.5 | yes |
| 8 | 6.3 | 0.05 | 0.1 | 0.09 | yes | 0.05 | 0.08 | 0.07 | yes |
| 9* | 10 | 7 | 10 | 9 | no | 6 | 10 | 9 | no |
| 10 | 8 | 5 | 9 | 7 | no | 5 | 8 | 7 | no |
| 11 | 6 | 3 | 8 | 5 | no | 3 | 6 | 5 | no |
| 12 | 4 | 2 | 7 | 4 | no | 2 | 6 | 4 | no |
| Mixture of the mod. Siloxanes | | | | | | | | | |
| | Example | | | | | | | | |
| 50% | 1 | | | | | | | | |
| 50% | 8 | 2 | 3 | 3 | no | 2 | 3 | 2 | no |
| 50% | 4 | | | | | | | | |
| 50% | 8 | 1 | 2 | 2 | no | 1 | 2 | 1.5 | no |

*not of the invention

It follows from the Table that the organopolysiloxanes, modified pursuant to the invention, have the desired application properties. In pure form or in admixtures, they exhibit satisfactory adhesion on the respective support, can be cured quickly on this, show good abhesive properties towards adhesives of chemically different structures and, in contrast to the state of the art, can be adjusted to the chemical character of the adhesive by a suitable choice of substituents on the same siloxane framework.

What is claimed is:

1. A polysiloxane with (meth)acrylate ester groups linked over SiC groups which is the reaction product of
   (A) a polysiloxane of the general average formula

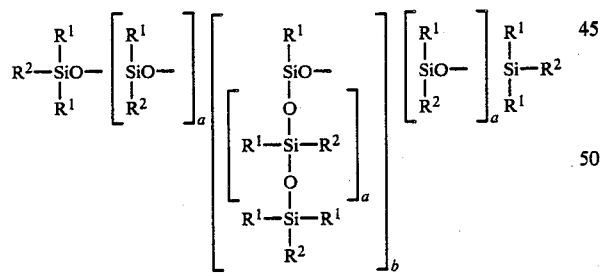

in which
R$^1$ groups are the same or different and represent lower alkyl with 1 to 4 carbon atoms or phenyl,
R$^2$ groups are the same as R$^1$ or represent R$^3$ groups, 70 to 100% of the R$^3$ groups being epoxy-functional groups and 30 to 0% of the R$^3$ groups being hydrogen or alkyl groups with 2 to 10 carbon atoms which may be optionally substituted with halogen or phenyl groups, with the proviso that the average molecule contains at least 1.8 epoxy groups,
a has a value of 1 to 1,000 and
b has a value of 0 to 10;

(B) (meth)acrylic acid, in 0.4 to 0.9 molar amount based on the number of epoxide groups and (C) a monocarboxylic acid free of double bonds capable of polymerizing, in an amount effective to react with the remaining epoxide groups.

2. A polysiloxane as claimed in claim 1, wherein said monocarboxylic acid of (C) has 2 to 10 carbon atoms.

3. A polysiloxane as claimed in claim 2, wherein said monocarboxylic acid is acetic acid.

4. A polysiloxane as claimed in claim 1 or 2, wherein the subscript a has a value of 5 to 200 and the subscript b a value of 0 to 2.

5. A polysiloxane as claimed in claim 1 or 2, wherein subscript b has a value of 0.

6. A polysiloxane of claims 1 or 2, in which at least 90% of the R$^1$ groups are methyl groups.

7. A polysiloxane of claims 1 or 2, wherein the epoxyfunctional R$^3$ groups of are selected from the group consisting of

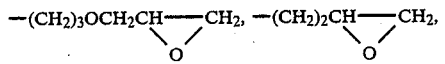

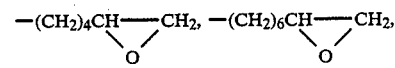

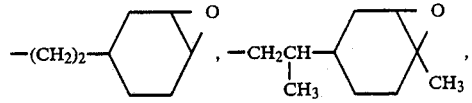

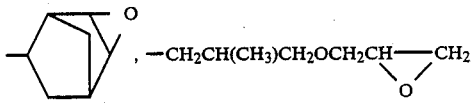

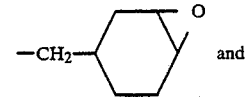 and

-continued

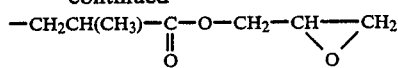

8. A polysiloxane of claims 1 or 2, wherein the $R^2$ groups comprise $R^3$ groups which are alkyl groups selected from the group consisting of ethyl, propyl, n-butyl, iso-butyl, hexyl, octyl, dodecyl, octadecyl, 2-phenylpropyl and 3-chloropropyl.

9. A radiation curable abhesive coating composition essentially consisting of a polysiloxane as claimed in claim 1 and up to about 5% by weight of a free radical initiator.

10. A coated product, comprising a substrate having an abhesive surface coating, said coating being formed by a radiation-cured layer of a polysiloxane of claims 1 or 2.

11. The coated product of claim 10, wherein said layer additionally contains a minor amount of a free radical initiator.

* * * * *